US011003635B2

(12) United States Patent
Zengerle et al.

(10) Patent No.: US 11,003,635 B2
(45) Date of Patent: May 11, 2021

(54) DATABASE SCHEME FOR STORING GENERIC DATA

(71) Applicant: SAP SE, Walldorf (DE)

(72) Inventors: Felix Zengerle, Karlsruhe (DE); Thomas Elsaesser, Hockenheim (DE); Verena Woerner, Sandhausen (DE)

(73) Assignee: SAP SE, Walldorf (DE)

( * ) Notice: Subject to any disclaimer, the term of this patent is extended or adjusted under 35 U.S.C. 154(b) by 717 days.

(21) Appl. No.: 15/245,439

(22) Filed: Aug. 24, 2016

(65) Prior Publication Data

US 2018/0060364 A1 Mar. 1, 2018

(51) Int. Cl.
*G06F 16/21* (2019.01)
*G06F 16/22* (2019.01)

(52) U.S. Cl.
CPC ........ *G06F 16/211* (2019.01); *G06F 16/2246* (2019.01); *G06F 16/2282* (2019.01)

(58) Field of Classification Search
CPC ..... H04L 51/066; H04L 51/046; G06F 16/13; G06F 16/211; G06F 16/2246; G06F 16/2282; G06F 16/2423; G06F 16/258; G06F 16/27
USPC ................................ 707/756, 760, 812, 602
See application file for complete search history.

(56) References Cited

U.S. PATENT DOCUMENTS

| | | | |
|---|---|---|---|
| 7,644,095 B2* | 1/2010 | Gauthier | G06F 17/2247 707/999.101 |
| 8,082,492 B2* | 12/2011 | Hattori | G06F 16/835 715/234 |
| 8,676,863 B1* | 3/2014 | Connell | G06F 16/284 707/804 |
| 8,819,145 B1* | 8/2014 | Gailloux | H04L 51/066 709/206 |
| 9,535,966 B1* | 1/2017 | Noble | G06F 16/951 |
| 2004/0093344 A1* | 5/2004 | Berger | G06F 16/288 |
| 2005/0010458 A1* | 1/2005 | Holloway | G06F 16/27 707/609 |
| 2006/0015809 A1* | 1/2006 | Hattori | G06F 16/835 715/255 |
| 2006/0161573 A1* | 7/2006 | Dettinger | G06F 16/2425 |
| 2007/0005613 A1* | 1/2007 | Singh | G06Q 20/40 |
| 2007/0089115 A1* | 4/2007 | Stern | G06F 17/272 719/313 |

(Continued)

*Primary Examiner* — Dangelino N Gortayo
(74) *Attorney, Agent, or Firm* — Buckley, Maschoff & Talwalkar LLC

(57) ABSTRACT

Provided are a system and method for generating a database scheme for storing different types of data structures. In one example, the method includes receiving a first data object having a first data structure and a second data object having a second data structure that is different than the first data structure, generating a database scheme based on the first data structure and the second data structure, wherein the generated database scheme retains information about a structure of the first data structure and a structure of the second data structure, and storing the first data object and the second data object, in a database, according to the generated database scheme. According to various aspects, by at least partially retaining the original structure of the data objects, further searching and processing may be performed on different types of data objects stored in a relational database.

20 Claims, 7 Drawing Sheets

(56) References Cited

U.S. PATENT DOCUMENTS

| | | | |
|---|---|---|---|
| 2008/0040513 A1* | 2/2008 | Asakawa | G06F 9/451 710/1 |
| 2012/0096185 A1* | 4/2012 | Naparstek | H04L 41/145 709/246 |
| 2012/0143949 A1* | 6/2012 | Kumar | H04L 67/2823 709/204 |
| 2012/0215799 A1* | 8/2012 | Bohner | G16H 10/60 707/755 |
| 2013/0006968 A1* | 1/2013 | Gusmini | G06F 16/25 707/722 |
| 2013/0198245 A1* | 8/2013 | Kagan | G01D 4/004 707/812 |
| 2013/0275363 A1* | 10/2013 | Wu | G06F 9/46 707/602 |
| 2013/0297654 A1* | 11/2013 | Khimich | G06F 21/6227 707/783 |
| 2016/0055184 A1* | 2/2016 | Fokoue-Nkoutche | G06F 16/213 707/809 |
| 2016/0269343 A1* | 9/2016 | Li | H04L 51/32 |
| 2017/0220606 A1* | 8/2017 | Wang | G06F 16/212 |

\* cited by examiner

DATABASE SCHEME FOR STORING GENERIC DATA

BACKGROUND

A storage device such as a relational database may organize data into one or more tables of columns and rows, with a key identifying each row. Generally, each table represents one entity type such as a customer entity or a product entity. In this arrangement, the rows may represent instances of that type of entity such as a name of a person or a name of a product, and the columns may represent values attributed to that instance such as an address of the person or a price of the product. Digital databases are commonly used to store big data because of the flexibility, ease of use, security, data independence, and data manipulation capabilities of a digital database. Storing and analyzing big data are of significant importance to software systems. For example, data sets may be analyzed and interpreted by these systems to predict a future behavior or a future event. The data sets may include data that is collected from multiple external data sources such as devices on the internet of things (IoT). To analyze the data, the data is often transferred from the external data sources to a backend system where it can be stored for evaluation at a later point in time.

In some software systems, the transfer of data may be accomplished by sending messages from the data sources to specific interfaces within the backend system. The interfaces may have different structures or they may be built differently in order to receive and transmit different types of data messages (e.g., one interface may receive orders, another interface may receive available products, and the like). Therefore, messages within the system can be composed of different data structures. When an error occurs (e.g., semantic error) while processing a message, the system may persist the message and attempt to recover the message at a later point in time. For example, the system may wait until there is a group of messages to be analyzed. To persist a group of messages that have different data structures, the system typically requires an unnormalized database scheme or even a schemaless database. However, an unnormalized scheme may limit further processing, because the data's original structure gets lost on a database layer. For instance, aggregating or searching within specific columns or even within joined tables is very limited or prevented. Doing this on an application layer results in a negative impact to the performance of the system and increases overall complexity.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
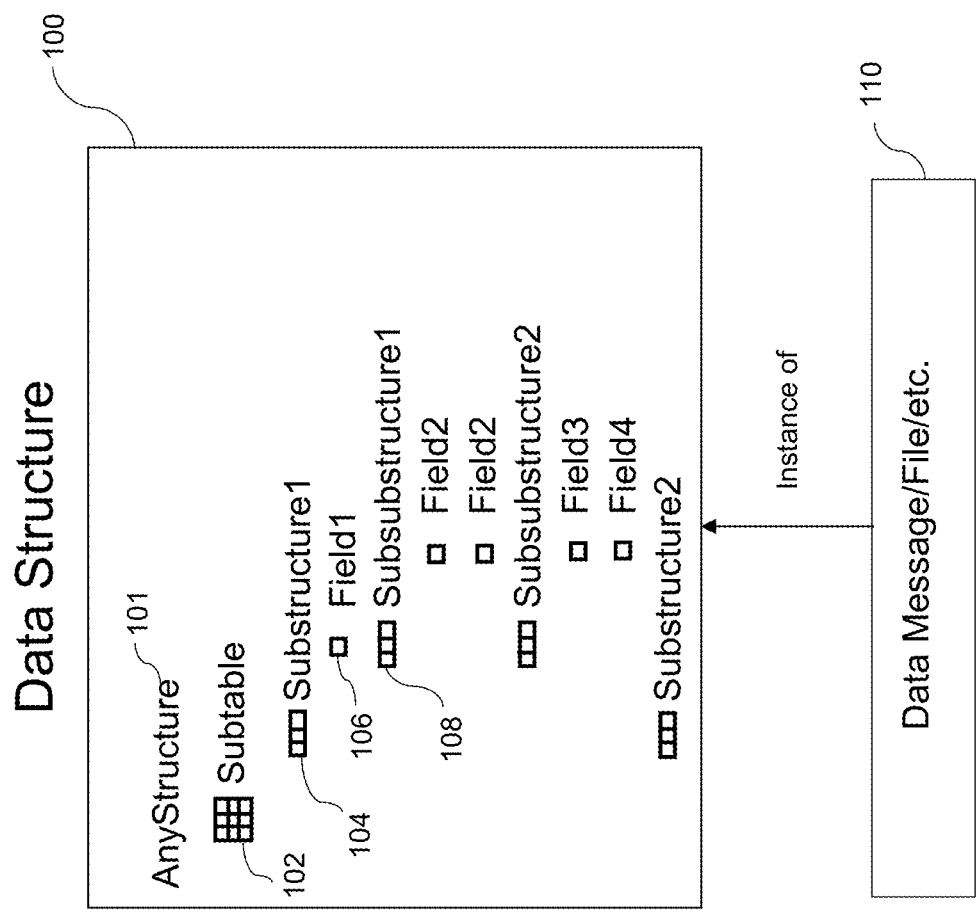
FIG. 1 is a diagram illustrating a sample data structure in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The examples provided herein are directed towards a system and method for storing generic data in a relational database or other type of digital database. Data objects such as messages, files, and the like, may have different data structures (e.g., different fields, formats, tables, and the like). A data structure is typically a description of a message, file, and the like, which contains the data. According to various aspects, a data structure can be used to generate a normalized database scheme to store generic data in the same database (e.g. a relational database) while still retaining information about the differing data structures of the original data. Furthermore, because information about the structure of the data is maintained, the data may be subsequently searched and/or processed based on its original data structure and by utilizing the capabilities of the installed database system, for example, querying and aggregating records, joining tables, and the like, in a relational database.

As a non-limiting example, the data described herein may be "big data" which is collected and stored in a network, for example, an Internet of Things (IoT) infrastructure in which physical devices collect and exchange data with a backend system such as a cloud computing environment. However, the embodiments are not limited to big data and may be any type of data that is stored and further processed. In some examples, the data may be used for predictive analytics, user behavior analytics, or other advanced data analytics methods that extract value from different types of data. As one example, the data may be used with data processing applications. Analytical applications may have difficulty handling different types of data from across a large network in which the different types of data are collected and processed together. Furthermore there are situations in which an error occurs during processing of the data (e.g., the data messages, data files, and the like).

In a predictive analytics system, accuracy in the data may be critical because it can lead to more confident decision making, resulting in greater operational efficiency, cost reduction, and reduced risk. Therefore, correcting the errors is of significant benefit to the system. However, to manually or automatically correct these errors at a later point of time or in a different environment/context, it is beneficial to store the data message/file and analyze the errors as a group to look for patterns, trends, consistencies, etc. As described herein, data messages may be used to transfer data between different informational technology (IT) systems in the system. The messages may have different data structures corresponding to different system interfaces. The different structures may include different fields of information, different substructures, and the like. As a result, messages for each interface may look differently and have data that is structured differently. To further evaluate and possibly correct an error in a message, the message may be persisted in a database until a later point in time when it can be analyzed with a larger group of messages.

In a related art, because the messages have different data structures, the data is typically stored unnormalized and/or structureless in order to store the differing data structures in a single relational database. That is, the structured data is converted into unstructured data to accommodate the different data structures. In one such related environment, a message is persisted by converting the message into an XML, file in which the information included in a plurality of fields and tables of the message are converted into a single combined string of text. This string of text represents the data of the entire message. That is, multiple fields of a structured message are stored as one long text field within a database record or other document resulting in unstructured message data. In this related environment, when converted and stored, further processing of the message data is very difficult because the structure of the message is gone on a storage level as a result of the conversion and storage. To access the data, the stored content has to be loaded, interpreted and restored. Furthermore, direct access to specific fields of the data is not possible.

In contrast, the example embodiments provide a database scheme generator that generates a combined database scheme for a plurality of different data structures and deploys the database scheme within the database such that different types of data structures can be stored in the same dedicated place in the database while retaining information about the respective data structures. With this information the database is able to access/search/etc. within specific fields of the data without interpreting it first. According to various aspects, the database scheme generator may perform a pre-processing step or steps on different data structures to generate a single combined database scheme capable of retaining information about the different data structures. As a result, data that has different structures may be stored together and searched together in a single relational database based on a single database scheme.

FIG. 1 illustrates a sample data structure 100 in accordance with an example embodiment. Referring to FIG. 1, the data structure 100 represents the structure (i.e., format) of a data object 110 such as a data file, a message, and the like. For example, a data structure 100 may be a description of the format of a data object 110 such as a message, a file, and the like, which contains the data. As another example, the data stricture may be a table. The data structure 100 may have a hierarchical format and may vary, for example, based on the devices transmitting and/or receiving the data object 110. In the example of FIG. 1, the data structure 100 has a root 101. Here, the root 101 is the root of a plurality of subcomponents as substructures and/or fields within the data. In FIG. 1, the structure's root 101 includes a plurality of substructures such as subtable 102. The structures and substructures may include various data types such as one or more tables, fields, sets, graphs, arrays, or other structures. Each of the structures and substructures may have a format, data type, and the like, associated therewith. Also, a table may contain one or more other elements/structures in at least one dimension such as a field, subtable, list, array, set, map, and the like. In this example, subtable 102 includes substructure 104. The substructure 104 in this example includes a plurality of further subcomponents such as field 106 and substructure 108. Furthermore, the sub-substructures may include additional structures and fields.

Figure 2:
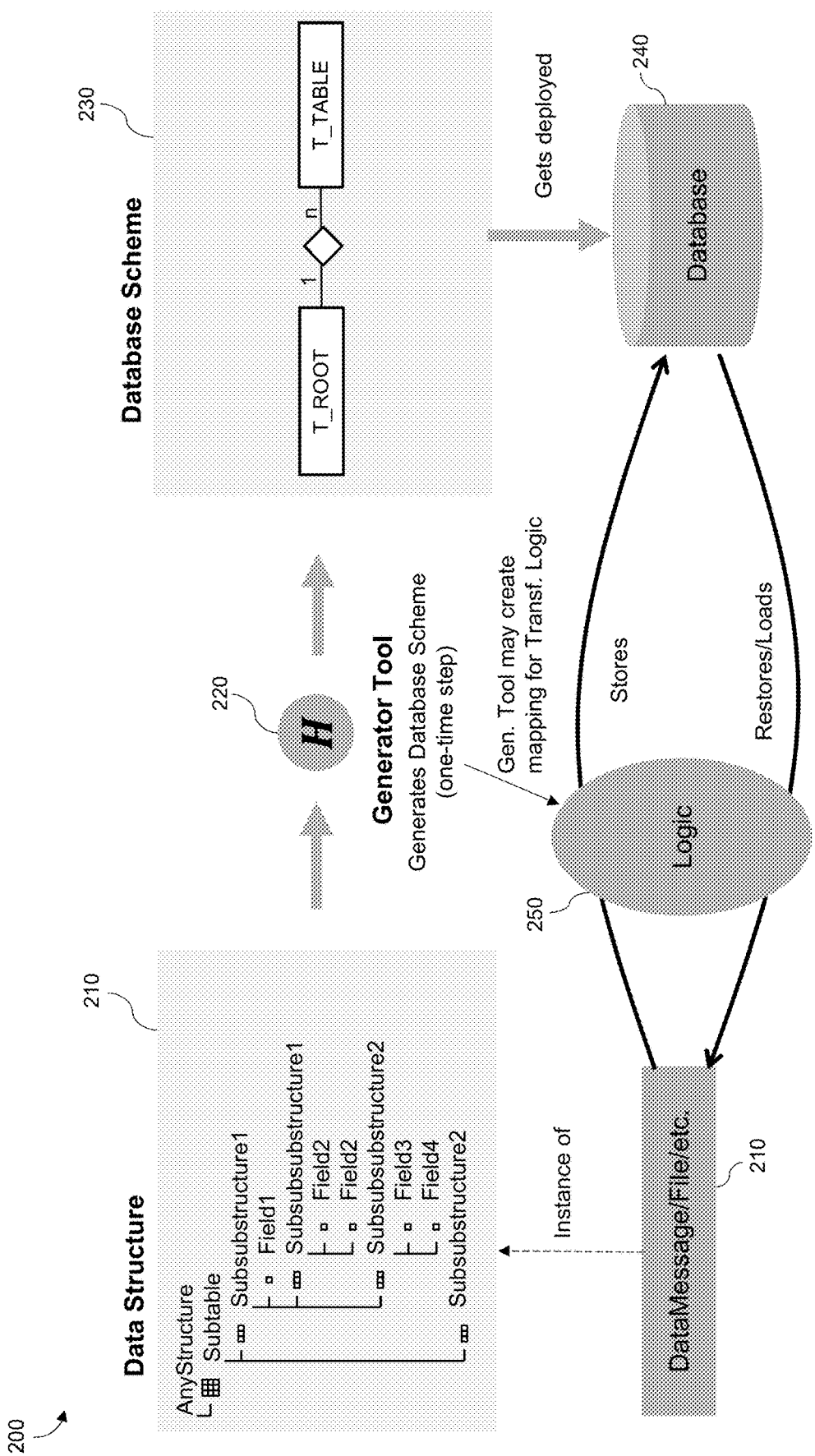
FIG. 2 is a diagram illustrating a process of generating a database scheme based on a data structure in accordance with an example embodiment.

FIG. 2 illustrates a process 200 of generating a database scheme based on a data structure in accordance with an example embodiment. In this example, a data structure 210 may represent or be a description of a data object such as a data message, data file, and the like, and it may be the same as data structure 100 shown in FIG. 1 or it may be a different data structure. According to various embodiments, a generator tool 220 may generate a database scheme 230 based on the data structure 210 of the corresponding data object. In the example in which the data structure 210 corresponds to a data message, the data message may not be limited to only one possible data structure but may be capable of having multiple data structures. The generator tool 220 may generate a database scheme for a given data message based on its respective data structure. The generator tool 220 may repeat the database scheme generation process for each differently structured message. For example, the generator tool 220 may perform a preprocessing step for each data structure 210 of each differently structured message to generate a corresponding database scheme 230 used for storing all data messages. By using the generator tool 220 during preprocessing (e.g., before storing the data), multiple resulting database schemes can be merged into a single combined database scheme and deployed on database 240. Afterwards the data can be persisted in the generated database tables of the database 240 using the database scheme generated by the generator tool 220 and deployed on the database 240.

In the example of FIG. 2, the generator tool 220 may use a function (e.g., function H) which describes how a given data structure can be used to construct the database scheme 230. For example, the function H may use the data structure to create a table in the database scheme 230 for every substructure, subtable, and the like. In this example, each field in the data structure 210 may get transferred into a column of the parent structure or table included in the database. The resulting database tables in the database scheme 230 may be connected by using relations. For example, each generated table in the database scheme 230 may be designated an ID column that is used to identify the table and that is also used as a primary key. Each table generated through a substructure or subtable may also be designated a parent ID column as a foreign key to describe the hierarchy. An example of generating a database scheme 230 is described with respect to FIG. 5. The generator tool 220 may use the data structure 210 of the data object as input and generate the database scheme 230 based thereon. This may be performed one time per data structure. Then, the generated database scheme 230 may be deployed or implemented on the database 240.

In addition to storing data, the data may be loaded, restored, joined and the like, to and from the database 240. To perform any of these functions, the data from a message (or file, etc.) may be transformed from the message to the database scheme 230 deployed on the database 240. For example, the transformation of the data may be performed by transformation logic 250. That is, the transformation logic 250 may transform the data included in the message to the database scheme 230. For example, the generator tool 220 may not only generate the database scheme 230 but also generate a mapping that identifies which fields of the data structure 210 relate to which portions of the database scheme 230. As an example, a field of the data structure 210 may relate to or correspond to a certain column in a database table according to the database scheme 230. The mapping information may be extracted during the generator process and stored in a storage (not shown). The mapping information may be loaded during the transformation process to map and move the data from the message to the database 240. As another example, the mapping can be generated on the fly or in advance. As yet another example, the generator tool 220 may not perform the mapping, but could use a separate component. Regardless, the data is moved from the original data object having the data structure 210 to corresponding rows/columns of the database scheme 230 within the database 240 based on the transformation logic 250.

Figure 3:
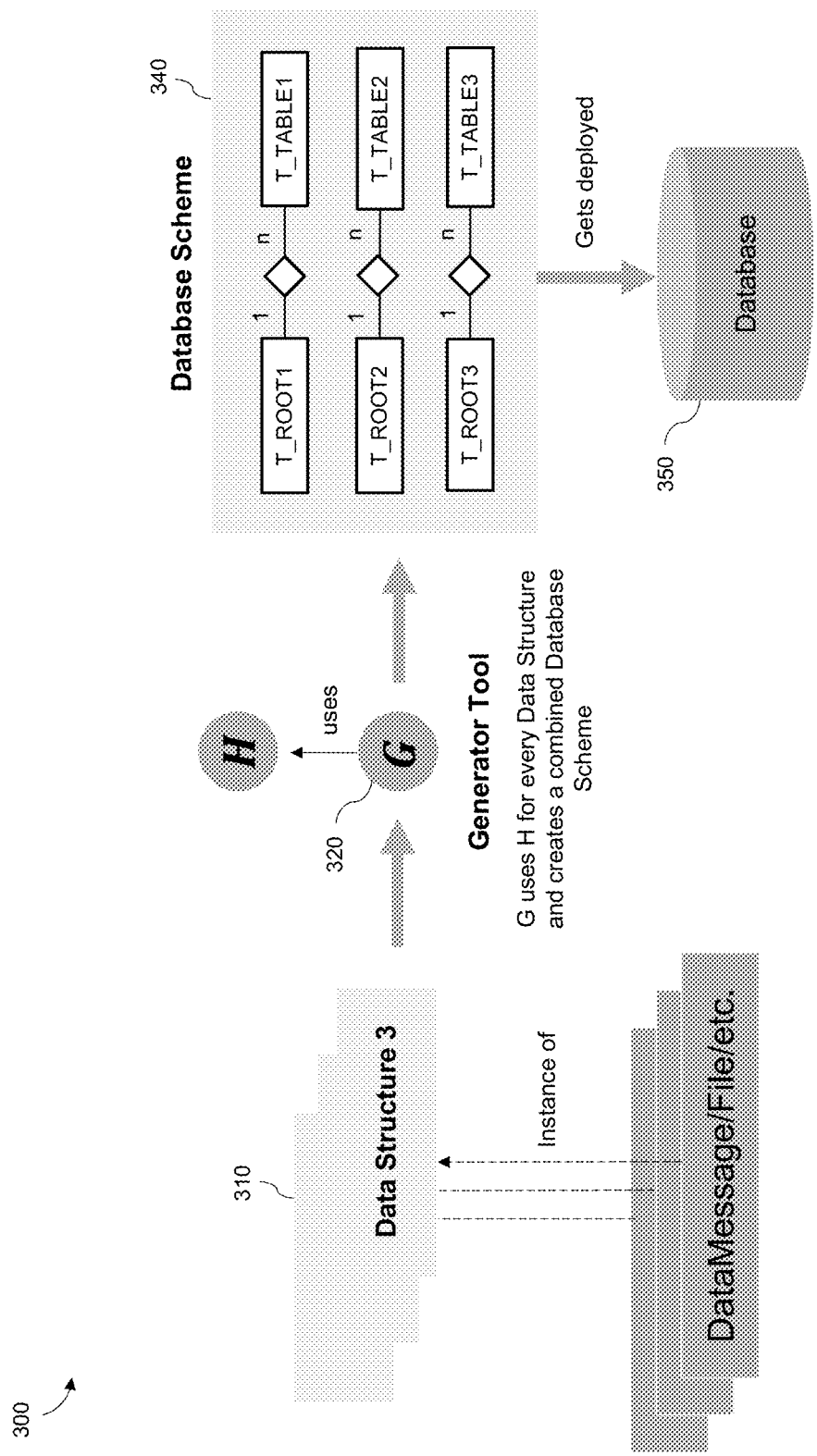
FIG. 3 is a diagram illustrating a process of generating a database scheme for a plurality of data structures in accordance with an example embodiment.

FIG. 3 illustrates a process 300 of generating a database scheme for a plurality of data structures in accordance with an example embodiment. In this example, a plurality of data messages having a plurality of respective data structures 310 may be stored in database 350 using a single database scheme 340. In this example, generator tool 320 uses a function H to generate a relational database scheme for a given data structure 310 from among the plurality of data structures 310. In addition, there also exists a combining tool as part of the generator tool 320 that uses a function G to generate a set of relational database schemes for the set of data structures 310 by applying the function H to each data structure 310. The combiner tool function G as part of generator tool 320 combines the results of function H into a single database scheme. As a result, the database schemes can be merged and deployed on the database 350 as a single combined database scheme 340. Accordingly, different data structures of data can be persisted in the tables of the database 350 according to the one database scheme 340. In the example of FIG. 3, the generator tool 320 not only works for one data message/structure but it works for many. In addition, the combiner tool as part of the generator tool 320 may use function H to generate a single database scheme 340 for many data structures corresponding to many data objects. As a result, a plurality of different data structures may be persisted onto a single relational database 350 while still retaining information about their structure thereby enabling further searching and processing based on the original structure of the data object.

Figure 4:
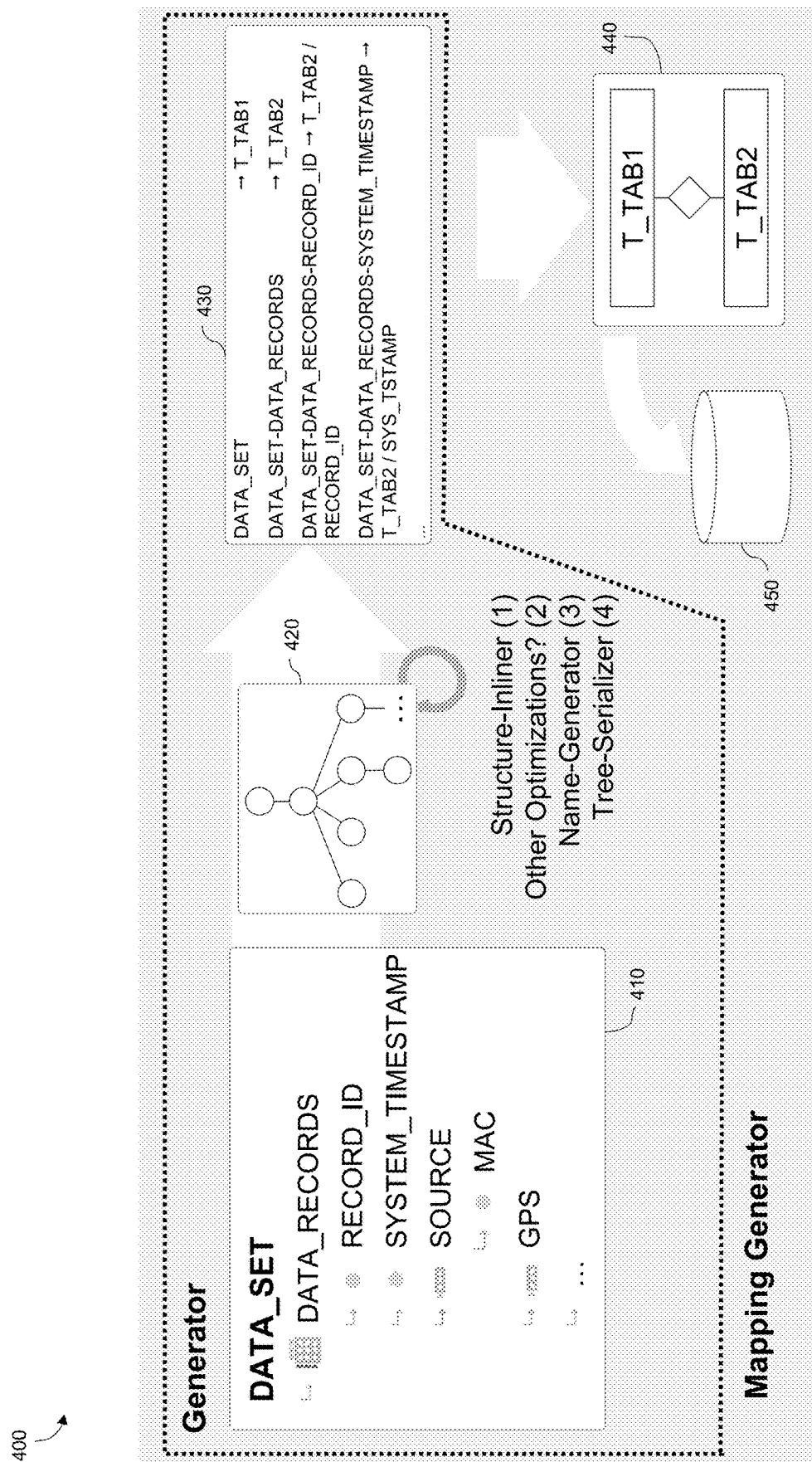
FIG. 4 is a diagram illustrating a process of generating a database scheme from a tree structure in accordance with an example embodiment.

FIG. 4 illustrates a process 400 of generating a database scheme from a structure in accordance with an example embodiment. That is, FIG. 4 provides an example of how to construct a function G for use in the generator tool according to various embodiments. In this example, structure 410 is the input for the function. The structure's format includes a plurality of types of data or data fields. For example, a data record of the data set 410 may include a field for system date/time represented by a timestamp, an identifier, a MAC address, global positioning system coordinates, and the like. The data set 410 is transformed into the mapping 430 shown on the right side of FIG. 4. Between the data set 410 and the resulted mapping 430 is a tree structure 420 which is used by the transformation logic (e.g., transformation logic 250 shown in FIG. 2) of the data set 410. In this example, the tree 420 may be built from a data structure of the data set 410 and the tree 420 may be transformed to generate the database scheme. Optimization and/or transformation operations may be applied to the tree 420, for example, a structure inlining operation, a name generating operation (e.g., columns, rows, tables, etc.), other optimizations, and the like. In addition, the tree 420 may be serialized to extract a mapping 430. The mapping defines which component of the structure is mapped to which part of the database scheme. In the example of FIG. 4, a mapping is given for the RECORD_ID field, which is mapped to the RECORD_ID column of the T_TAB2 table. The database scheme 440 may be implicitly contained in the mapping and can be derived easily. It may be enhanced by some administrative parts (e.g., columns for primary and foreign keys). As a result, it may contain the tables, their columns and types as well as the relations. Furthermore the function H described in the example of the generator tool in FIG. 3 may be implemented by generating a tree 420 for each data structure or executing the process for each structure.

The optimization performed on the tree 420 may improve the database scheme by reducing the amount of tables 440 needed for the database 450 to store the data messages, files, etc., corresponding to the data structures. For example, the optimization process may create a database scheme which uses less database tables 440 than if the data structure was stored on a one-to-one ratio where each component of a data structure is given its own table in the database tables 440. Also, the embodiments described herein may inline the structures and corresponding substructures. For example, a structure may have one instance of the substructure within it, and by inlining the structure and the substructure they can share the same table among the tables 440. However, in some examples it may be difficult to inline a subtable because then the structure may relate to multiple rows in the substructure. In this example, a separate or additional table among the tables 440 may be used and the multiple tables may be connected using relations and columns as a parent ID included within one or more of the tables.

Figure 5:
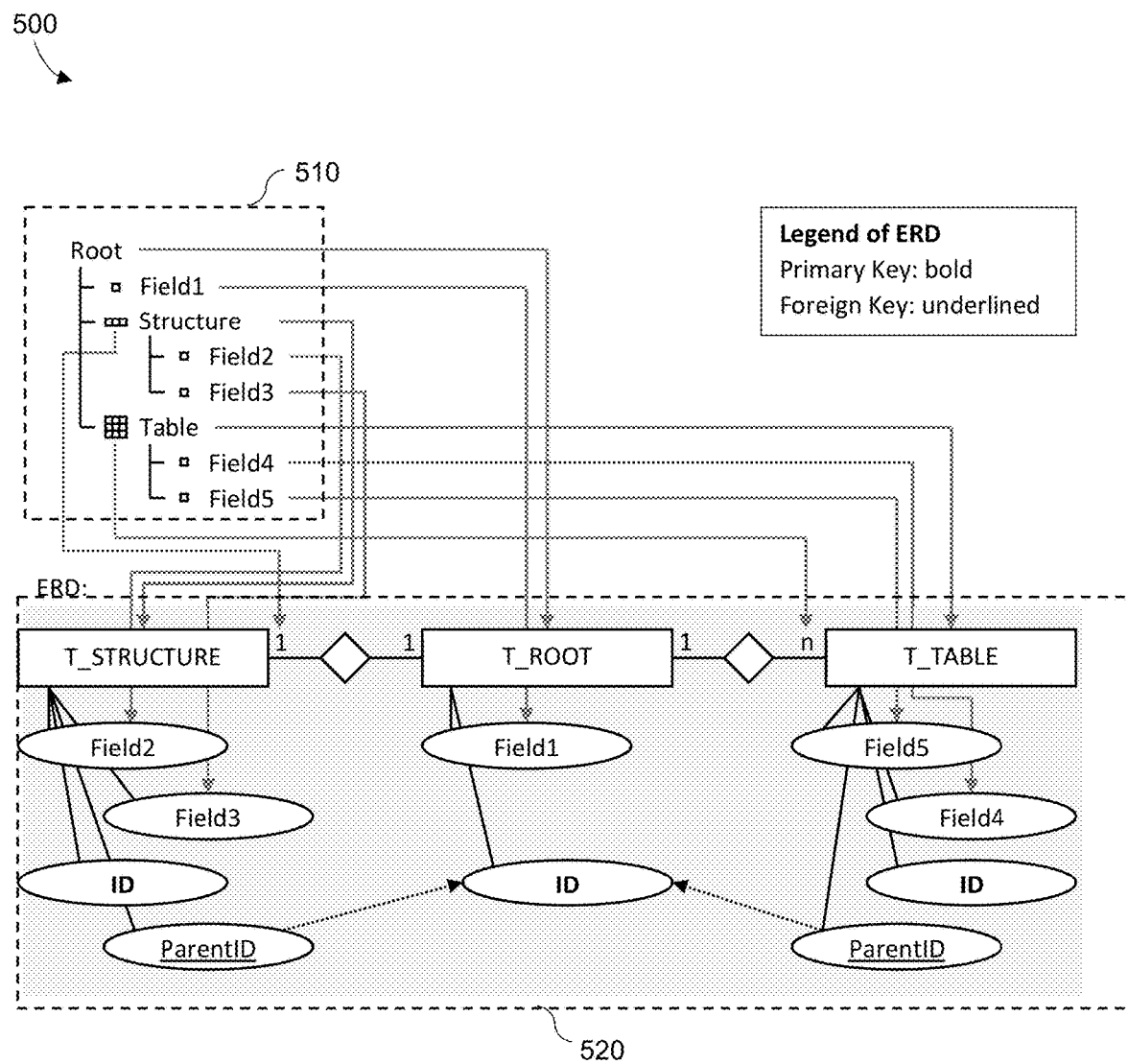
FIG. 5 is a diagram illustrating a process of deriving a database scheme from a data structure in accordance with an example embodiment.

FIG. 5 illustrates an example 500 of deriving a database scheme from a data structure 510 in accordance with an example embodiment. In this case, the data structure 510 is used to generate the database scheme shown as entity-relationship diagram (ERD) 520. As an initial step, an algorithm is derived to determine a database scheme for storing a data structure. Further, the algorithm is used to generate a tree structure (such as tree structure 420 shown in FIG. 4) which may be used to generate the database scheme.

As a general understanding, $\mathbb{D}$ is defined as the set of all possible data structures and $\mathbb{S}$ is defined as the set of all possible relational database schemes. Assume that the set of used data structures is $D \subset \mathbb{D}$ and the set of needed relational database schemes is $S \subset \mathbb{S}$. In Equation 1 below, S and D are both limited in size by k elements. For D this means that it is known which data structures are used in general.

$$|D|S|=k, \text{ with } k<\infty \quad \text{(Equation 1)}$$

According to various aspects, a function H as shown in Equation 2 may be used to generate a relational database scheme s∈S for a given data structure d∈D. An example of function H is represented in Equation 2.

$$H_1: D \to S, d \to s \quad \text{(Equation 2)}$$

According to various aspects, a function G may be used to generate a set of relational database schemes S for a given set of data structures D by applying the function H for each d∈D.

As an example, the function G may be defined as:

$$G(D)=S \quad \text{(Equation 3)}$$

The invariant of G holds:

$$\forall d \in D_1 H(d) \in S \quad \text{(Equation 4)}$$

The result of function G from Equation 3 can then be combined to a single database scheme. When using the function in a preprocessing step, the resulting database schemes can be merged and deployed on the database. Afterwards the data can be persisted in the generated database tables.

The function H in Equation 2 describes how a given data structure d can be used to construct a database scheme s. Here, function H uses data structure d and creates a table in database scheme s for every substructure or subtable (the term table can also be a list or an array or similar parts of data structures). Every field in data structure d gets transferred into a column of the parent structure or table. The resulting database tables may be connected by using relations. Also, each generated table in database scheme s gets an ID column to identify (and an object ID column if required by the intended purpose) and be used as primary key. Each table generated through a substructure or subtable in addition may also get a parent ID column as foreign key.

The function H can also be seen as a function that describes how a given data structure d can be transformed into a database scheme s. By using a further step in between, the above description of H can be fulfilled by the following steps:

Step 1: Build up a tree describing the components of data structure d
Step 2: Serialize the tree to generate data scheme s
Step 3: Postprocessing of s In a first step, the data structure d may be decomposed into its components. Each substructure or subtable included therein may be represented as a node in the tree and the structure itself is the tree's root. Every field may further be represented as a leaf in the tree. In a second step the tree is serialized. Therefore each node may be regarded as a table and each leaf as a column in the parent node's table. In the last step the resulting database scheme s is enhanced by adding the keys. As described, each table may receive an id column (and an object id column) as primary key. Each table, except the table derived from the tree's root node, additionally may receive a parent id column as foreign key. In general this step also performs the naming of the elements used in the database scheme. The examples herein may not describe how these names are generated, because this may depend on the used technologies and the intended purpose. But still, these names may be unique to some extends. For example, a table name may be unique across the database. In general these problems can be solved by checking for duplicated names and resolve them by appending a collision counter.

FIG. 5 illustrates an example of how a database scheme 500, shown as the ERD 520, gets derived from the data structure 510. The root of the data structure 510 is mapped to the table T_ROOT of the ERD 520. The field referred to as Field1 of the data structure 510 is mapped as a column with the same name into this table of ERD 520. The substructure and the subtable of data structure 510 are both mapped to separate tables in ERD 520. Both are connected to the T_ROOT table of ERD 520 by using the Parent ID as foreign key. The component type of a substructure or subtable may directly influence the cardinality of the relation. As an example of a substructure, a one to one cardinality may be sufficient because the substructure does not contain additional rows. However, a subtable may contain multiple rows referring to the same parent structure, which may lead to a one to many cardinality. In the example of FIG. 5, the ID and Parent ID columns may be administrative columns that are added in a last step. The ID columns are used as primary key and the Parent ID columns are used as foreign keys to realize the relationships between the tables.

Figure 6:
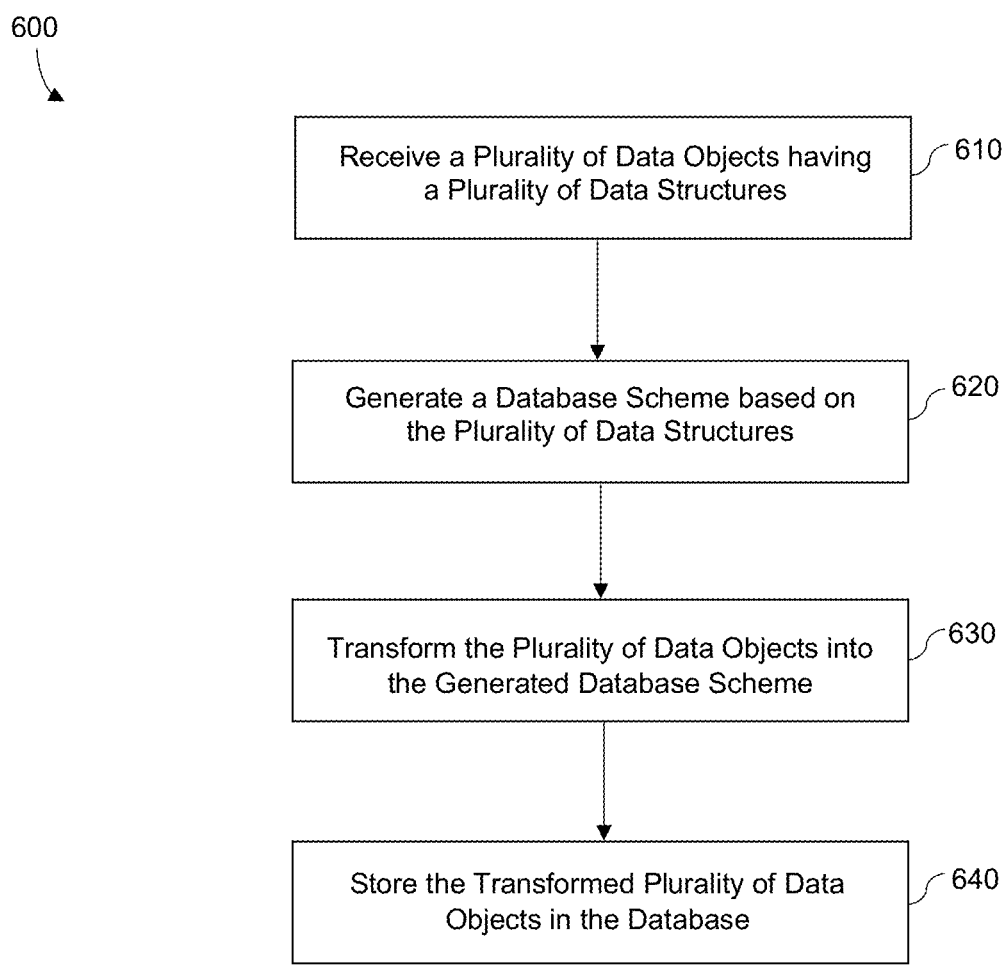
FIG. 6 is a diagram illustrating a method for generating a normalized database scheme in accordance with an example embodiment.

FIG. 6 illustrates a method 600 for generating a normalized database scheme in accordance with an example embodiment. Referring to FIG. 6, the method includes receiving a plurality of data objects having a plurality of data structures, respectively, in 610. For example, the plurality of data objects may include a first data object having a first data structure and a second data object having a second data structure that is different than the first data structure. The data object may refer to a data file, a data message, and the like. It should also be appreciated that some data objects may have the same data structures or they may be different. In 620, the method further includes generating a database scheme based on the plurality of data structures. According to various embodiments, the generated database scheme may retain information about a structure of each of the plurality of data structures of the plurality of data objects. For example, if the plurality of data objects include a first data message having a first data structure and a second data message having a second data structure, the method may include retaining structure information of the first and second data structures. The database scheme may be generated using the previously described generator tool.

In some examples, the first data message may be represented by a first tree based on the first data structure, and the second data message may be represented by a second tree based on the second data structure. In this example, the database scheme may be generated based on a combination of the first tree and the second tree or on a combination of the database scheme resulting from the first tree and the database scheme from the second tree. As another example, the generating of the database scheme may include mapping a field of a first data structure to a respective column and/or a row of a table included in a database, and mapping a field of a second data structure to another respective column and/or a row of the table included in the database. In an example in which the first data object is a first data message and the second data object is a second data message, the first data structure may correspond to a first message type or a first interface configured to receive the first message, and the second data structure may correspond to a second message type and/or a second interface configured to receive the second message. As another example, the generating of the database scheme may include generating a first database scheme based on the first data structure, generating a second database scheme based on the second data structure, and merging the first database scheme and the second database scheme into a single combined database scheme to generate the database scheme according to various embodiments.

The method further includes generating and/or executing transformation logic based on the generated database scheme and transforming data from corresponding to the plurality of data objects into the generated database scheme, in 630. For example, the transforming may include transforming a format of a first data message from a first data structure into a format of the database scheme based on the generated transformation logic, and transforming a format of a second data message from a second data structure into the format of the database scheme based on the generated transformation logic. Furthermore, in 640 the method includes storing the transformed plurality of data objects in the database according to the database scheme. For example, the database may include a relational database or another type of digital database.

Figure 7:
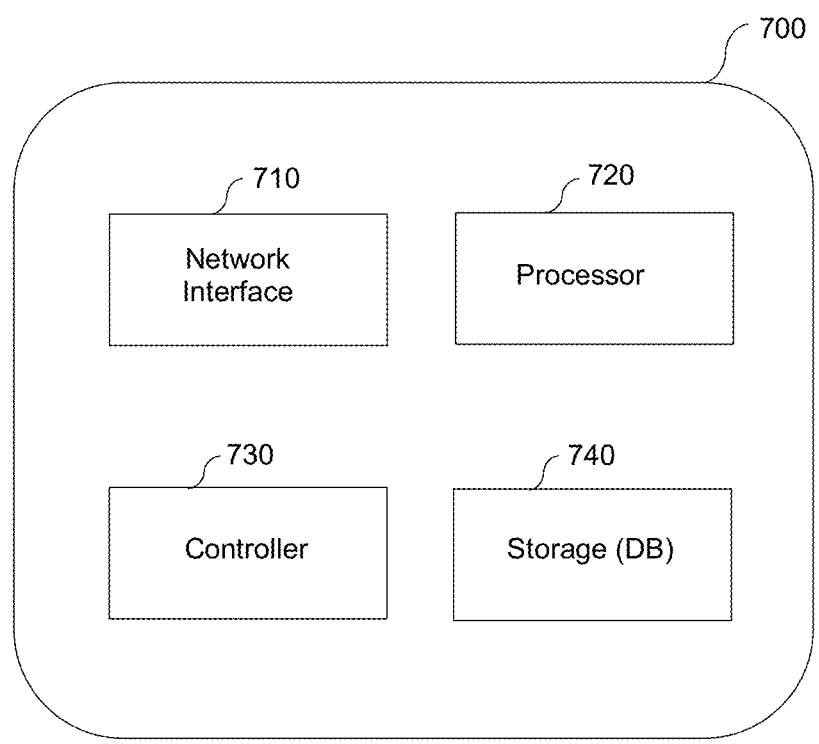
FIG. 7 is a diagram illustrating a database scheme generating device in accordance with an example embodiment.

FIG. 7 illustrates a database scheme generating device 700 in accordance with an example embodiment. For example, the database scheme generating device 700 may be a computing device such as a computer, a server, a mobile device, a router, a cloud computing device, and the like, configured to perform the method 600 of FIG. 6. Furthermore, in some examples, the database scheme generating device 700 may include an internal database for deploying the database scheme. As another example, the database scheme generating device 700 may be connected to an external database, for example, over a network or through another means such as a secure channel, a wired channel, a wireless channel, or a combination thereof. Although not shown in FIG. 7, the database scheme generating device 700 may include a receiving component capable of receiving data objects such as messages and files from other components or devices.

Referring to FIG. 7, the database scheme generating device 700 includes a network interface 710, a processor 720, a controller 730, and a database storage 740. The network interface 710 may receive data objects from one or more other devices. For example, the network interface 710 may receive messages, data files, and the like. The processor 720 may include one or more processing devices having a single core or multicores. For example, the processor 720 may include circuitry and/or logic for processing the methods steps of FIG. 6. The controller 730 may control data that is stored in the database storage 740. For example, the controller 730 may deploy a database scheme on the database storage 740. As an example, the database 740 may be a relational database or other type of digital database. Although the processor 720 and the controller 730 are shown separately for convenience of description, the functions of the two components may be combined into a single device or a combination of device and software.

In this example, the network interface 710 may receive a first data object having a first data structure and a second data object having a second data structure that is different than the first data structure. For example, the first and second data objects may be messages received from an Internet of Things infrastructure or other system or device in which messages are transmitted, but not limited to two devices or systems. The processor 720 may generate a database scheme based on the first data structure and the second data structure. The generated database scheme may retain structural information about the first data structure and about the second data structure, thereby enabling further searching and processing to be performed on the first and second data objects when they are persisted into storage 740. The controller 730 may store the first data object and the second data object, in the storage 740, according to the generated database scheme.

In some examples, the processor 720 may generate transformation logic based on the generated database scheme, and the controller may transform a format of the first data object from the first data structure into a format of the database scheme based on the generated transformation logic, transform a format of the second data object from the second data structure into the format of the database scheme based on the generated transformation logic, and store the transformed first data object and the transformed second data object in the database storage 740. In some examples, the processor 720 may identify a first tree based on the first data structure, identify a second tree based on the second data structure, and generate the database scheme based on a combination of the first tree and the second tree or as a combination of the resulted database schemes. In this example, the first data structure may be represented by a first tree and the second data structure may be represented by a second tree, and the processor 720 may generate the database scheme based on the first tree and the second tree. To generate the database scheme, the processor 720 may perform transformations and/or optimizations on the tree structure of the data. For example, the processor 720 may perform one or more of inlining one or more nodes in a tree which have a one to one relationship to a parent node in the tree, splitting nodes in a tree, for example, to reduce complexity of the tree, allow reuse/sharing of nodes, and/or to fulfill limitations of the used database system (e.g. maximum number of allowed columns per table), merging nodes in a tree to share common parts of a structure in the respective tree, assigning a table name to nodes and a column name to leaves of the tree, and the like.

As another example, the processor 720 may map a field of the first data structure to a respective column and/or a row of a table included in the database 740, and map a field of the second data structure to another respective column and/or a row of the table included in the database 740. In some examples, the processor 720 may generate a first database scheme based on the first data structure, generate a second database scheme based on the second data structure, and merge the first database scheme and the second database scheme into a single combined database scheme to generate the database scheme.

The example embodiments are directed to a system and method for generating a database scheme for generic data. For example, the generic data may have a plurality of different data structures which may be accounted for by a single database scheme. In the examples herein, the structure of a data object (e.g., a data message, data file, and the like) may be input to a generator tool which may generate a database scheme based thereon. This pre-process may be repeated for a plurality of different data objects having different data structures. As a result, a plurality of data schemes may be generated. The example embodiments may merge or otherwise combine the data schemes into a single data scheme which retains structural information about a plurality of different data objects and deploy the data scheme on a database. Accordingly, data that has a different structure, or looks different, may be stored in a single relational database. In addition, by retaining the original structure of the data objects further searching and processing may be performed on the different types of data objects stored in the same relational database.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
    an interface configured to receive a message from a sender which comprises a generic data structure;
    a processor configured to decompose the message into one or more substructures and generate a combined database schema in which the processor
        maps a structure representing the message to a first table and names of a plurality of fields within the message to names of a plurality of columns of the first table, respectively,
        maps a substructure from among the one or more substructures to a second table and names of a plurality of fields within the substructure to names of a plurality of columns of the second table, respectively,
        adds an identifier column of the first table to the second table to generate a foreign key relationship between the second table and the first table,
        generate the combined database scheme including the plurality of columns of the first table comprising the mapped names of the plurality of fields of the message and the plurality of columns of the second table comprising the mapped names of the plurality of fields of the substructure; and
    a controller configured to move data from the message into columns of a database table comprising column names based on the combined database scheme, and store the database table in a database.

2. The computing device of claim 1, wherein the processor is further configured to generate transformation logic based on the combined database scheme, and
    the controller is configured to transform a format of the generic data structure into a format of the combined database scheme based on the generated transformation logic.

3. The computing device of claim 1, wherein the generic data structure is represented by a tree, and the processor is configured to generate the combined database scheme based on a transformation of the tree into the combined database scheme.

4. The computing device of claim 3, wherein the transformation of the tree comprises at least one of:
    inlining one or more nodes in the tree which have a one to one relationship to a parent node in the tree;
    splitting nodes in the tree;
    merging nodes in the tree to share common parts of the tree; and
    assigning a table name to each node and a column name to each leaf of the tree.

5. The computing device of claim 1, wherein the processor is further configured to store mapping information which maps a field of the structure to a respective column and/or a row of the combined database scheme, and maps a field of the substructure to another respective column and/or a row of the combined database scheme.

6. The computing device of claim 1, wherein the combined database scheme generated by the processor retains information about the different respective fields included in the structure and the substructure of the message.

7. The computing device of claim 1, wherein the processor is configured to generate the combined database scheme by inserting both the first table of the structure and the second table of the substructure into the combined database scheme.

8. The computing device of claim 1, wherein the processor is configured to name the plurality of columns of the first table with corresponding names of the plurality of fields from the message that are mapped thereto.

9. The computing device of claim 1, wherein the processor adds the identifier column of the first table to an administrative column of the second table to generate the foreign key relationship between the second table and the first table.

10. A method comprising:
    receiving a message from a sender which comprises a generic data structure;
    decomposing the message into one or more substructures;
    mapping a structure representing the message to a first table and names of a plurality of fields within the message to names of a plurality of columns of the first table, respectively;
    mapping a substructure from among the one or more substructures to a second table and names of a plurality of fields within the substructure to names of a plurality of columns of the second table, respectively;
    adding an identifier column of the first table to the second table to generate a foreign key relationship between the second table and the first table;
    generating a combined database scheme that includes the plurality of columns of the first table comprising the mapped names of the plurality of fields of the message and the plurality of columns of the second table comprising the mapped names of the plurality of fields of the substructure;

moving data from the message into columns of a database table comprising column names based on the combined database scheme; and storing the database table in a database.

11. The method of claim 10, further comprising generating transformation logic based on the combined database scheme, wherein the transforming comprises transforming a format of the generic data structure into a format of the combined database scheme based on the generated transformation logic.

12. The method of claim 10, wherein the generic data structure is represented by a tree, and the generating comprises generating the combined database scheme based on a transformation of the tree into the combined database scheme.

13. The method of claim 12, wherein the transformation of the tree comprises at least one of:

inlining one or more nodes in the tree which have a one to one relationship to a parent node in the tree;

splitting nodes in the tree;

merging nodes in the tree to share common parts of the tree; and assigning a table name to each node and a column name to each leaf of the tree.

14. The method of claim 10, wherein the method further comprises storing mapping information which maps a field of the structure to a respective column and/or a row of the combined database scheme, and maps a field of the substructure to another respective column and/or a row of the combined database scheme.

15. The method of claim 10, wherein the combined database scheme retains information about the different respective fields included in the structure and the substructure of the message.

16. The method of claim 10, wherein the generating comprises inserting both the first table of the structure and the second table of the substructure into the combined database scheme.

17. A non-transitory computer readable medium having stored therein instructions that when executed cause a computer to perform a method comprising:

receiving a message from a sender which comprises a generic data structure;

decomposing the message into one or more substructures;

mapping a structure representing the message to a first table and names of a plurality of fields of the message to names of a plurality of columns of the first table, respectively;

mapping a substructure from among the one or more substructures to a second table and names of a plurality of fields within the substructure to names of a plurality of columns of the second table, respectively;

adding an identifier column of the first table to the second table to generate a foreign key relationship between the second table and the first table;

generating a combined database scheme that includes the plurality of columns of the first table comprising the mapped names of the plurality of fields of the message and the plurality of columns of the second table comprising the mapped names of the plurality of fields of the substructure;

moving data from the message into columns of a database table comprising column names based on the combined database scheme; and storing the database table in a database.

18. The non-transitory computer readable medium of claim 17, wherein the generic data structure is represented by a tree, and the generating comprises generating the combined database scheme based on a transformation of the tree into the combined database scheme.

19. The non-transitory computer readable medium of claim 17, wherein the method further comprises storing mapping information which maps a field of the structure to a respective column and/or a row of the combined database scheme, and maps a field of the substructure to another respective column and/or a row of the combined database scheme.

20. The non-transitory computer readable medium of claim 17, wherein the generating comprises inserting both the first table and the second table into the combined database scheme.

* * * * *

UNITED STATES PATENT AND TRADEMARK OFFICE
CERTIFICATE OF CORRECTION

PATENT NO. : 11,003,635 B2
APPLICATION NO. : 15/245439
DATED : May 11, 2021
INVENTOR(S) : Felix Zengerle et al.

Page 1 of 1

It is certified that error appears in the above-identified patent and that said Letters Patent is hereby corrected as shown below:

In the Claims

Column 11, Line 44, Claim 1, should read:
1. A computing device comprising:
   an interface configured to receive a message from a sender which comprises a generic data structure;
   a processor configured to decompose the message into one or more substructures and generate a combined database schema in which the processor
      maps a structure representing the message to a first table and names of a plurality of fields within the message to names of a plurality of columns of the first table, respectively,
      maps a substructure from among the one or more substructures to a second table and names of a plurality of fields within the substructure to names of a plurality of columns of the second table, respectively,
      adds an identifier column of the first table to the second table to generate a foreign key relationship between the second table and the first table, and
      generates the combined database scheme including the plurality of columns of the first table comprising the mapped names of the plurality of fields of the message and the plurality of columns of the second table comprising the mapped names of the plurality of fields of the substructure; and
   a controller configured to move data from the message into columns of a database table comprising column names based on the combined database scheme, and store the database table in a database.

Signed and Sealed this
Sixth Day of July, 2021

Drew Hirshfeld
*Performing the Functions and Duties of the
Under Secretary of Commerce for Intellectual Property and
Director of the United States Patent and Trademark Office*